Patented July 31, 1945

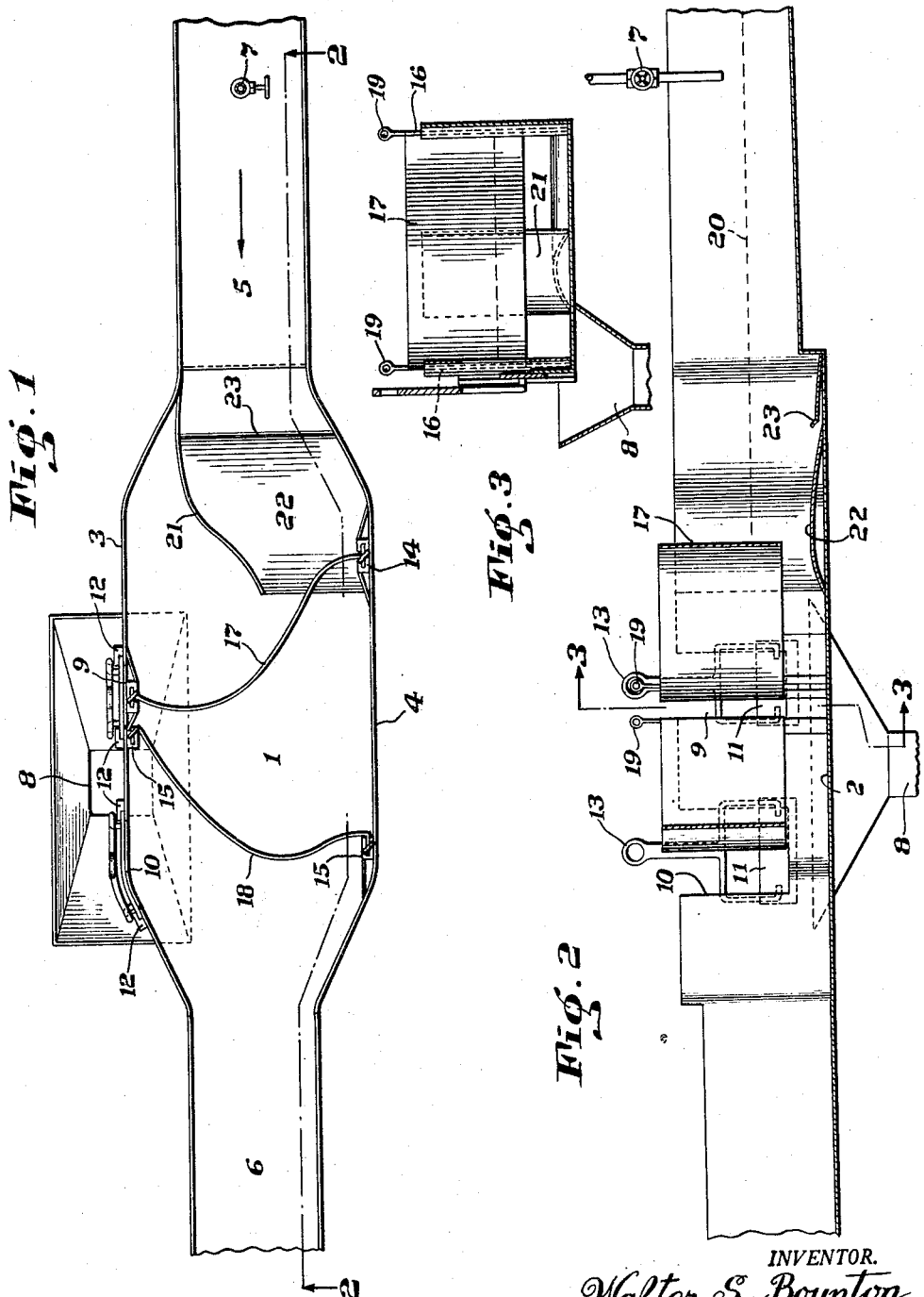

2,380,498

UNITED STATES PATENT OFFICE 2,380,498

METHOD AND APPARATUS FOR TREATING VEGETABLES TO REMOVE UNWANTED PARTICLES THEREFROM

Walter S. Boynton, Portland, Maine

Application November 17, 1942, Serial No. 465,856

9 Claims. (Cl. 209—156)

My present invention relates to method and apparatus for use in treating such vegetables as can be conveyed in a flume by a stream of water to remove therefrom skins and other unwanted matter prior to the canning of such vegetables.

The problem presented by objectionable particles adhering to the vegetables has long been recognized in the canning industry. Efforts to provide suitable apparatus to solve the problem have not been satisfactory, and, as a result, considerable manual labor is required to remove the skins and other undesirable matter from the vegetables to ensure the desired quality of the canned product.

In accordance with my present invention, I successfully treat any vegetables that can be conveyed in a stream of water. Such vegetables are heavier than water and when prepared for canning have an appreciable quantity of skins or other particles adhering to their surfaces. Among such particles there may also be present foreign matter.

I treat the vegetables by conveying them through a chamber in a stream of water. Within the chamber, the vegetables are caused to roll and are forced below the surface so that particles freed from the surfaces of the vegetables as they are rolled, float to the surface in a zone where they are carried to waste in an overflow stream, while the treated vegetables are discharged from the chamber in the main stream.

I accomplish this result by providing the chamber with at least one baffle extending from side to side of the chamber and spaced from the chamber floor with its lower edge below the water level in the chamber. The baffle is preferably disposed to cause the vegetables to roll and are effective to force them well below the surface of the water so that particles, freed from the vegetables by the rolling action, float to the surface and are carried to waste through the overflow port adjacent the baffle while the treated vegetables are carried through the chamber in the main stream.

Auxiliary means may be provided to ensure an adequate rolling of the vegetables at any point in their passage through the chamber under the influence of the main stream, and I also employ a trap for pebbles or other relatively heavy particles that unavoidedly are present among vegetables to be canned.

In the accompanying drawing I have shown an illustrative embodiment of my invention from which its many novel features and advantages will be readily apparent. In the drawing:

Fig. 1 shows apparatus in accordance with my invention in plan view.

Fig. 2 is a longitudinal section of the apparatus along the lines 2—2 of Fig. 1, and Fig. 3 is a cross section of the apparatus along the lines 3—3 of Fig. 2.

At 1, I have generally indicated a chamber having a floor 2 and sides 3 and 4 converging at their ends to the width of the inlet 5 and the outlet 6

The inlet 5 and the outlet 6 may be considered part of a conventional flume having a slight pitch, the water flow through which may be regulated by the valve controlled water source 7. The inlet 5 is disposed above the floor 2, which preferably also has a slight pitch, while the outlet 6 serves to drain the chamber 1.

At 8 I have shown a waste drain to receive the overflow through either the port 9 or the port 10 through the side wall 3, each overflow port being controlled by a gate 11. The gate 11 is guided in slides 12 carried by the side wall 3 and is provided with handles 13 to facilitate its adjustment to secure a desired overflow stream through either or both of the ports 9 and 10.

On the interior of the walls 3 and 4, I mount pairs of vertically disposed slideways 14 and 15, respectively, to slidably receive the supports 16 for the baffle plates 17 and 18. The supports 16 each have handles 19 to permit the baffle plates 17 and 18 to be spaced a desired distance from the floor of the chamber.

The baffle plates 17 and 18 are generally similar. Each is adapted to extend across the chamber 1 and is spaced above the floor 2 as desired but with its bottom edge below the level of the water in the chamber 1 indicated at 20 in Fig. 2, so that vegetables carried in the stream engage therewith and are caused to roll and are forced thereby below the surface of the water as they pass thereunder under the influence of the stream. Preferably the baffles 17 and 18 are also shaped to direct the wanted vegetables so that their course is substantially centrally of the chamber 1. By raising or lowering the baffle plates, the action of each may be regulated as desired.

Between the baffle 17 and the inlet 5, I preferably mount a baffle 21 disposed to initiate the rolling of the vegetables as they enter the chamber 1. The baffle 21 seats on the bottom of the chamber 1 on which I also mount a roll plate 22 between which and the inlet 5 I provide a trap 23 for such relatively heavy particles as pebbles and the like that sometimes are present among the vegetables to be canned.

In the operation of the apparatus shown in the drawing, the valve controlled water source 7 is adjusted to provide a stream suitable to carry the vegetables through the chamber 1 and the gate 11 is adjusted to provide overflow streams through the ports 9 and 10.

As the vegetables enter the chamber 1, heavy particles are caught in the trap 23 and vegetables engaging the baffle 21 are rolled and directed against the baffle 17 where the rolling action is continued. The current carries the vegetables under the baffle 17 and skins and like particles freed from the vegetables float to the surface where they are carried off in the overflow stream through the port 9 into the waste drain 8. While the overflow stream affects substantially the entire surface area intermediate the baffles 17 and 18, it is particularly effective adjacent the side wall 3 and for that reason, the baffle 17 is shaped to direct vegetables and particles engaging therewith towards the side wall 3.

Vegetables engaging the baffle 18 are again subjected to a rolling action and are forced thereunder by the stream. Any particles that may not have been freed from the vegetables and carried through the port 9, float to the surface, and are carried off in the overflow stream through the port 10 into the waste drain 8 while the treated vegetables are discharged through the outlet 6.

In order to ensure the proper treatment of the vegetables, the relation of the baffles 17 and 18 to the floor of the chamber 1 may be adjusted. The overflow streams through the ports 9 and 10 may also be regulated by raising or lowering the gate 11.

From the foregoing, it will be appreciated that in accordance with my invention I am able to treat vegetables to remove therefrom unwanted matter without interrupting the continuous flow of the vegetables through the flume. The number of baffle plates and of overflow streams may be varied provided that the vegetables are subjected to a sufficient rolling action and are sufficiently immersed so that the freed particles may float into the exhaust stream while the wanted vegetables are carried in the flume stream.

What I therefore claim and desire to secure by Letters Patent is:

1. The method of removing skin and other unwanted particles from peas, corn and such other vegetables that may be conveyed by water in a flume to a desired station, that comprises establishing a vegetable conveying main stream and an overflow stream laterally of the main stream, conveying in the main stream the vegetables to be treated, rolling the vegetables in the main stream laterally towards said overflow stream and simultaneously forcing them below the surface of the water while directing unwanted particles removed thereby towards the overflow stream whereby floating particles are removed by the overflow stream and the treated vegetables are conveyed by the main stream to the station.

2. Apparatus for use in removing skin and other undesirable particles from peas, corn, and such other vegetables as can be conveyed in a flume by a stream of water, said apparatus comprising a chamber including a floor and having an inlet port above said floor to receive flume contents, an outlet port disposed to drain said chamber of its contents, and an overflow port in one side of said chamber intermediate said other ports and slightly below the desired water level in said chamber, baffle means intermediate said overflow port and said inlet port spaced above said floor with its bottom edge below and its top edge above the water level and extending from side to side of said chamber to divert said stream towards one side of said chamber and to impart a rolling action to the vegetables carried in the stream of water and to force such vegetables under said baffle means adjacent the zone affected by the flow through said overflow port, thereby to permit particles otherwise adhering to the vegetables to float to the surface and pass through the overflow port, the wanted vegetables being carried by the stream through the outlet port.

3. Apparatus for use in removing skin and other undesirable particles from peas, corn, and such other vegetables as can be conveyed in a flume by a stream of water, said apparatus comprising a chamber having an inlet port to receive flume contents, an outlet port, and an overflow port intermediate said other ports to establish an overflow stream, means in said chamber intermediate said inlet and overflow ports intercepting the stream to impart to it a lateral flow and to impart to the vegetables carried therein a lateral rolling action towards said overflow port and to force under said means all the water and the vegetables carried thereby so that particles freed from the vegetables float to the surface in the zone influenced by said overflow stream.

4. Apparatus for use in removing skin and other undesirable particles from peas, corn, and such other vegetables as can be conveyed in a flume by a stream of water, said apparatus comprising a chamber having an inlet port to receive flume contents, an outlet port, first and second longitudinally extending horizontally curved sinuous baffle means intermediate said ports to intercept the stream to force vegetables carried therein below the surface thereof, the first of said baffle means being disposed to impart a rolling action to vegetables engaging therewith, and an overflow port intermediate said baffles establishing an overflow stream to receive floating particles freed from the rolling vegetables.

5. The apparatus of claim 4 in which the second baffle means is also disposed to impart a rolling action to vegetables engaging therewith and a second port is provided intermediate the second baffle means and the outlet port to establish a second overflow stream to receive floating particles freed from the rolling vegetables.

6. Apparatus for use in removing skin and other undesirable particles from peas, corn, and such other vegetables as can be conveyed in a flume by a stream of water, said apparatus comprising a chamber having an inlet port to receive flume contents, an outlet port, and an overflow port intermediate said other ports to establish an overflow stream, longitudinally extending horizontally curved sinuous baffle means in said chamber intermediate said inlet and overflow ports intercepting the stream to impart to the vegetables carried therein a rolling action towards said overflow port and to force the vegetables under said means and second means intermediate said overflow and outlet ports intercepting the stream to cause a spreading of the vegetables and to force the vegetables below the surface of the stream so that particles freed from the vegetables float to the surface in the zone influenced by said overflow stream.

7. Apparatus for use in removing skin and other undesirable particles from peas, corn, and such other vegetables as can be conveyed in a flume by a stream of water, said apparatus comprising a chamber having an inlet port to receive flume contents, an outlet port, a pair of longitudinally extending horizontally curved sinuous baffles, means vertically adjustably supporting said baffles so that said baffles extend from side to side of said chamber and having their bottom edges normally spaced from the bottom of the chamber to intercept the stream and cause the vegetables carried therein to roll and pass thereunder, said baffles converging towards each other adjacent one wall, an overflow port in said last named wall intermediate said baffles and an adjustable gate in control of said overflow port to establish an overflow stream to carry off freed particles floating to the surface intermediate said baffles.

8. Apparatus for use in removing skin and other undesirable particles from peas, corn, and such other vegetables as can be conveyed in a stream of water, said apparatus comprising a chamber having an inlet port to receive flume contents, an outlet port, and an overflow port to provide an overflow stream, means in said chamber to cause vegetables carried into the chamber by the stream to roll and to be submerged, said means being related to said overflow port so that particles freed from the vegetables float to the surface and into said overflow stream, said means including a roll plate on the bottom of said chamber adjacent said inlet port and a trap intermediate said plate and said inlet port to receive and hold heavy particles entering said chamber.

9. The apparatus of claim 8 in which the means are longitudinally extending horizontally curved sinuous and a sinuous baffle in the chamber defines with the inlet port and the roll plate a channel directing the stream against the means at a point remote from the overflow port.

WALTER S. BOYNTON.